June 21, 1949.  E. P. BULLARD, III  2,473,507
POSITIONING APPARATUS
Filed Nov. 13, 1946  3 Sheets-Sheet 1
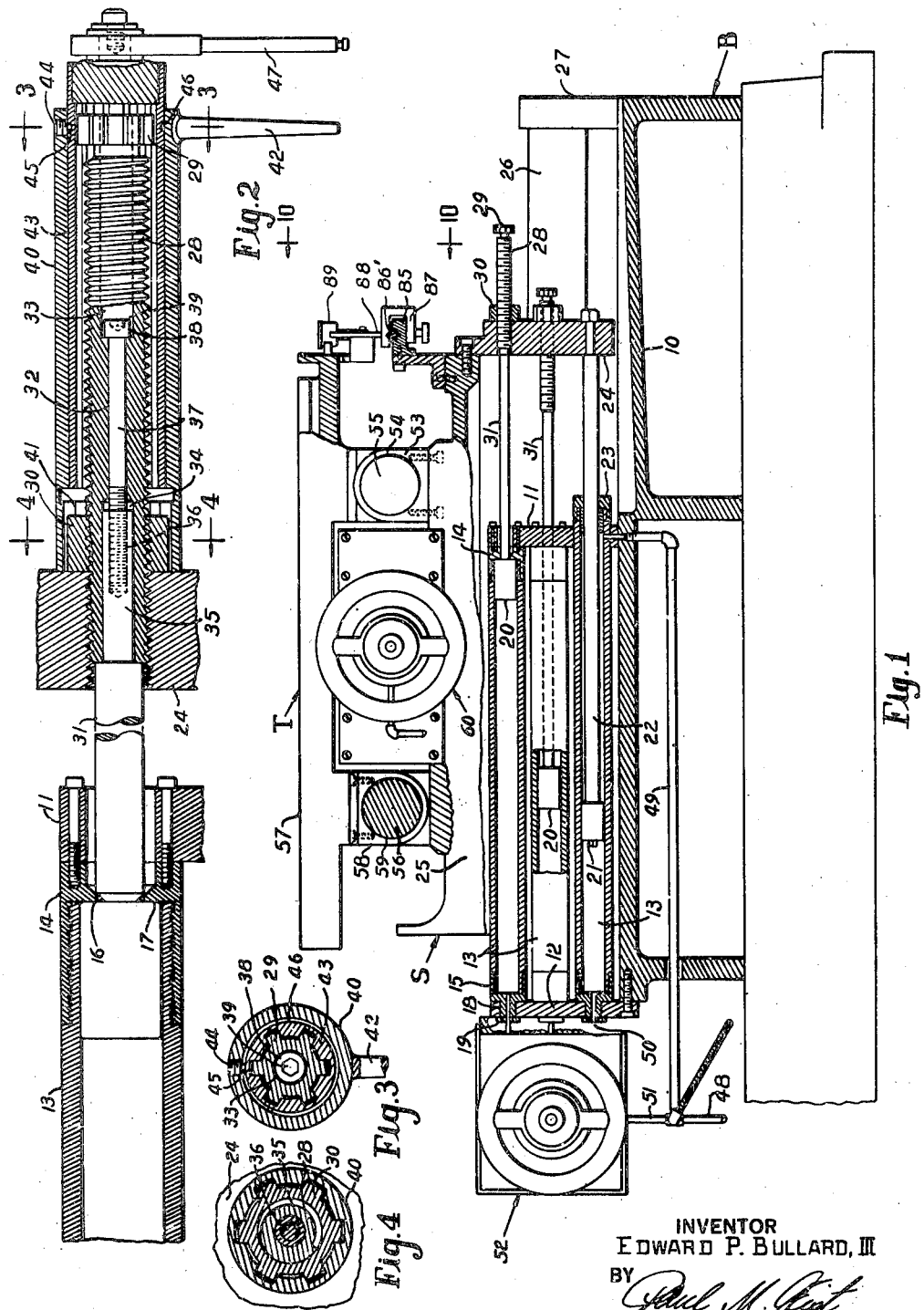
INVENTOR
EDWARD P. BULLARD, III
BY
ATTORNEY

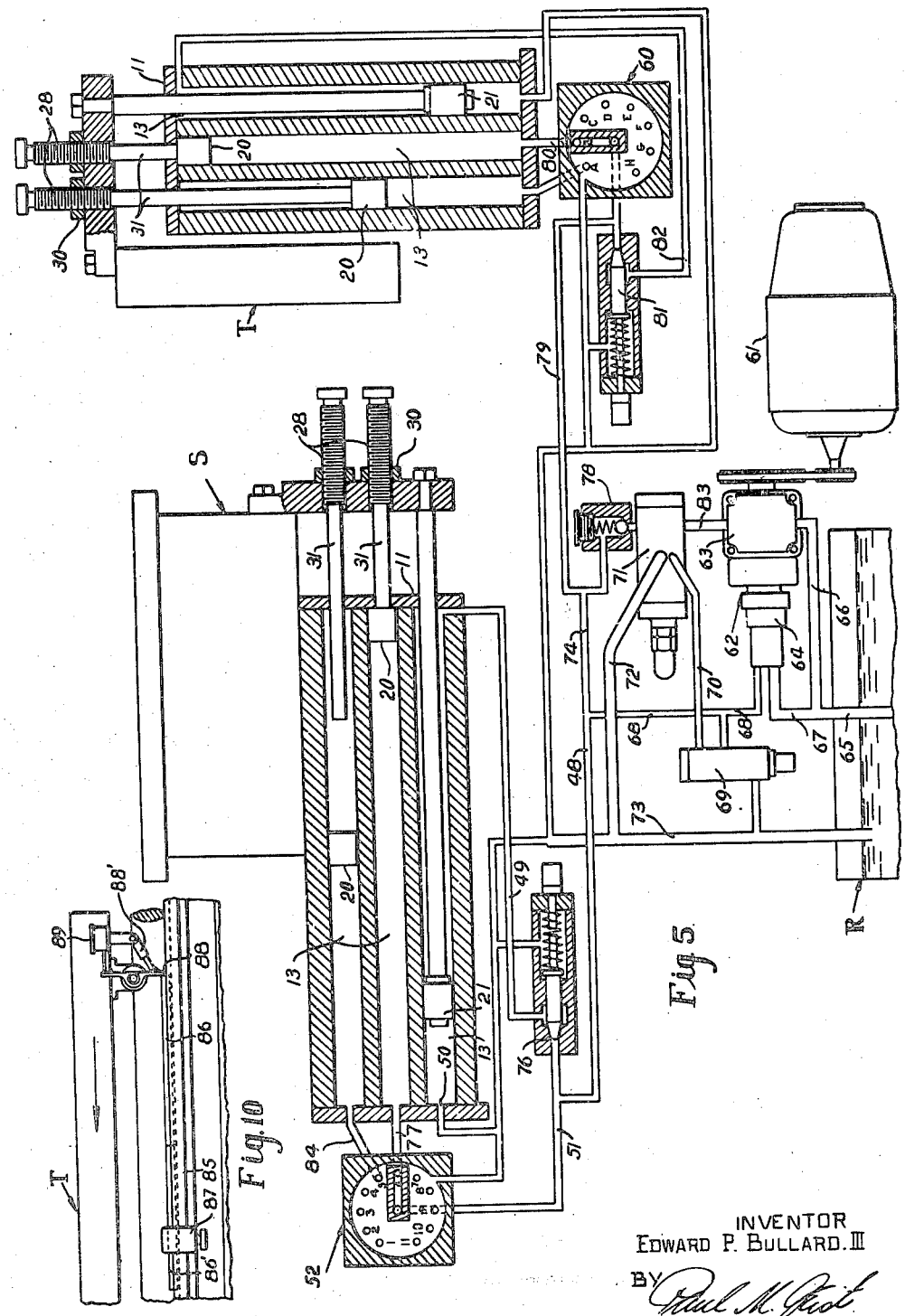

June 21, 1949.  E. P. BULLARD, III  2,473,507
POSITIONING APPARATUS
Filed Nov. 13, 1946  3 Sheets-Sheet 3

INVENTOR
EDWARD P. BULLARD, III
BY
ATTORNEY

Patented June 21, 1949

2,473,507

UNITED STATES PATENT OFFICE 2,473,507

POSITIONING APPARATUS

Edward P. Bullard, III, Fairfield, Conn., assignor to The Bullard Company, a corporation of Connecticut Application November 13, 1946, Serial No. 709,612

13 Claims. (Cl. 60—97)

This invention relates to machine tools and particularly to a positioning device adapted to be pre-set so that a member can be moved to, accurately stopped and rigidly held at a great number of different locations in any order within a manually controlled cycle of operations. This application contains subject matter similar to that shown, described and claimed in application Serial Number 571,637, filed January 6, 1945, in the name of Edward P. Bullard, III, and constitutes a modification of the apparatus disclosed in said application.

Any member that is movable along a path for a distance equal to its own dimension therealong must consume a space at least equal to twice that dimension. In the above-identified application, a space at least somewhat greater than about three times the length of the path of travel of the movable member along each of its paths is required, because the apparatus must accommodate the pre-setting of the adjusting screws at each end of the paths in the same cycle of operation. The principal object of the present invention is to provide apparatus of the type disclosed in said application wherein infinite adjustment of the screws can be made throughout the extent of the path of movement of the movable member while still requiring floor space of only about twice the length of the path of travel of the movable member.

Other objects include the provision of apparatus having a plurality of adjustment screws in close proximity to each other and a unitary device for readily adjusting and locking any of said screws; the provision of a machine tool having a work-supporting table adapted to be moved to and held at different locations by oppositely acting forces setting up a force couple tending to disturb the accuracy with which the table can be located, and a way construction that counteracts the force couple; and the provision of a fluid-operated positioning device combining a high pressure low volume, and low pressure large volume system so that the movable member can be moved to succeeding locations within a cycle of operations and rigidly held there with a minimum of elapsed time.

The above, as well as other objects and novel features of the invention will become apparent from the following specification and accompanying drawings, in which:

Figure 1 is a sectional elevational view showing a saddle and work support to which the principles of the invention have been applied;

Fig. 2 is an enlargement of part of the apparatus shown in Fig. 1 with an adjusting device applied to an adjusting screw;

Fig. 3 is a section taken substantially along line 3—3 of Fig. 2;

Fig. 4 is a section taken substantially along line 4—4 of Fig. 2;

Fig. 5 is a diagrammatic view disclosing the fluid system of the invention;

Fig. 10 is an elevational view looking along line 10—10 of Fig. 1.

Figure 8:
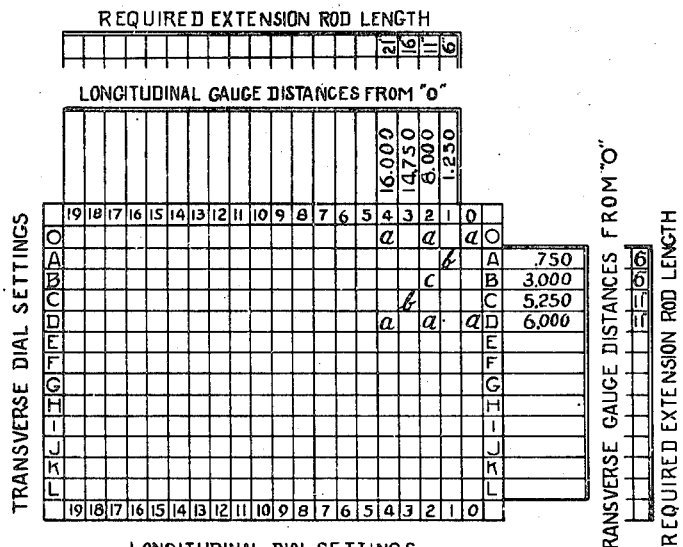
Figs. 7, 8 and 9 are charts that may be employed to facilitate the initial setting of the apparatus.

Referring to Fig. 1, the invention is shown as applied to a work-supporting device comprising a base B on which a saddle S is mounted for reciprocating motion along ways of the base B. A table T is mounted on the saddle S for reciprocating motion along ways on the saddle S that are arranged at right angles to the ways on the base B. The combined reciprocating motions of table T and saddle S provide means for locating the table at any point within the plane containing table T, and an area defined by the limits of motion of said table along its paths of motion.

The description of the apparatus shown, which is common to application Serial Number 571,637, will only be described sufficiently to show its relation to the present invention. Reference is made to said application for specific features and details.

Referring to Fig. 1, the base B includes a frame 10 having vertically disposed plates 11 and 12 rigidly attached to it. A plurality of tubular elements 13, forming cylinders, are threaded at each end to receive caps 14 and 15. The caps 14 (Fig. 2) are provided with a hole 16 of less diameter than the internal diameter of the tube 13 thereby forming an annular surface 17 for a purpose to be described later.

The outer surface of each cap 14 is provided with threaded holes so that it may be attached rigidly to the plate 11. Each cap 15 is provided with a neck 18 that is received in a hole formed in plate 12 in alignment with the hole formed by the annular surface of the corresponding cap 14. Nuts 19 rigidly secure the caps 15 to the plate 12. Each of the cylinders 13, except one is provided with a floating piston 20. The remaining cylinder 13 is provided with a piston 21 attached to a rod 22 that extends outwardly through a stuffing box 23 and is connected to a bracket 24 depending from the saddle S.

The saddle S comprises a frame member 25 that is adapted to be reciprocated along a pair (only one of which is shown) of spaced solid cylindrical ways 26 that are rigidly mounted in standards 27 fixed to the base B.

The bracket 24 includes an adjusting screw 28 for each of the cylinders 13 containing floating pistons 20. Each screw 28 is aligned with its corresponding piston 20, and each includes a splined head 29 and a lock nut 30 for accurately adjusting and locking the screw.

From the foregoing, it is evident that the floor space required for the apparatus described requires an amount greater than twice the length of travel of saddle S, assuming, of course, that the saddle will move throughout a distance equal to its own length. If the screws 28 are to cover adjustment of saddle S throughout its length, then an additional amount of floor space is required equal to another length of travel of saddle S since two adjustments within a cycle might require the saddle to be at opposite ends of its path of motion. In order to obtain adjustments throughout the entire path of travel of saddle S and still require no more floor space than about twice the length of travel thereof, the screws 28 are made of limited length and such that when they are located at their outermost positions, the heads 29 do not extend beyond the end of base B. The screws 28 are so constructed that removable extensions 31 can be attached to them in units that differ in length an amount equal to the adjustment of the screws 28. The longest extension 31 is equal to the length of the path of travel of saddle S less an amount equal to the adjustment of screw 28; while the shortest extension is equal to the length of adjustment of the screw 28.

Referring to Fig. 2, the screw 28 includes a bore 32 and counterbores 33 and 34 at each end thereof. The counterbore 34 is adapted to receive a neck 35 formed on each of the extensions 31. A threaded hole 36 in the end of neck 35 is adapted to receive a screw 37 that is inserted through the counterbore 33 such that its head 38 seats on the shoulder formed between bore 32 and counterbore 33. The head 38 includes a hex hole 39 for receiving the end of a tightening wrench that is adapted to be inserted within counterbore 33. The end of extensions 31 opposite the neck portion 35 is chamfered so that upon its repeated contact with its corresponding floating piston 20, no peening action will readily occur to produce inaccuracies in the positioning of the work.

In Fig. 2, the screw is located in its outermost position, and it is evident that the locking of nut 30 would be rather difficult particularly since it is desirable to locate all the screws 28 within as small an area as possible. In order to facilitate adjustment and locking of screws 28, a combined adjusting and locking device has been provided. Referring to Fig. 2, a tubular member 40 is provided with an internal construction 41 at its one end which fits the locking nut 30. A handle 42 is attached to its other end. The length of member 40 is such that handle 42 clears all the heads 29 of screws 28 when they are in their outermost positions. An inner tubular member 43 is journaled within member 40 and is held in proper axial relation thereto by a set screw 44 in member 40 that includes a finger 45 that rides in a groove 46 in the periphery of member 43. The inner surface of member 43 is splined to receive the splined head 29 of screws 28. Member 43 extends outwardly beyond member 40 and is provided with a commercial reversible-ratchet wrench 47. It is evident from the foregoing that the device can be used readily to adjust the screws 28 and lock them in adjusted position even though they are closely spaced.

Fluid, preferably oil under pressure, is employed to cause the reciprocation of saddle S along the ways 26. Accordingly, a supply line 48 is adapted to supply oil under pressure through a pipe 49 leading to the end of the cylinder 13 containing piston 21 that is adjacent the bracket 24, constantly tending to move the saddle S leftwardly (Fig. 1). The other end of this cylinder is exhausted to the reservoir R through a port 50 and a line 73. A pipe 51 supplies the oil to a rotary valve 52 similar to the rotary valve shown in application Serial Number 571,637. The valve 52, upon selective manual actuation supplies high pressure oil to any one of the cylinders 13 containing floating pistons 20 while exhausting all others to the main reservoir. It is provided with a port for each cylinder 13, only eleven being shown in the present embodiment and numbered 1-11 (Fig. 5). Therefore, when valve 52 is set say, to supply oil to the top cylinder 13, its piston 20 is caused to rapidly move rightwardly (Fig. 1) until it is stopped by the annular surface 17 of cap 14 which is attached to plate 11. It is to be noted that the caps 14 are omitted from the diagrammatic sketch of Fig. 5, and with respect thereto reference will be made to the engagement of pistons 20 with plate 11 rather than with caps 14. The oil acting on piston 21 moves saddle S leftwardly until extension 31 abuts piston 20 in the top cylinder 13. Turning valve 52 so that oil is supplied to the next lower cylinder 13 (Fig. 1), and thereby opening the top cylinder to exhaust, causes the floating piston in said second cylinder to force the saddle rightwardly through contact with the corresponding extension and screw 28 because the effective area of the floating piston is twice that of the piston 21 and the oil pressure is the same in each cylinder.

The frame 25 of the saddle S includes on one side, a plurality of spaced brackets 53 (only one being shown) having circular openings 54 therein in aligned relation for supporting a solid cylindrical way 55 similar to way 26 and of a length greater than the length of table T by an amount equal to the desired movement of said table. Another set of such brackets is provided on the other side of frame 25 for supporting a similar solid cylindrical way 56.

The table T includes a work-supporting platform 57, to the bottom and on one side of which is fixed a plurality of spaced brackets 58 (only one being shown) having circular openings 59 therein in aligned relation that act as slide bearings on the way 56. A similar set of brackets is located on the opposite side of table T for cooperation with the way 55.

An additional set of cylinders and floating pistons as well as a main piston and cylinder are located on the frame 25 between ways 55 and 56, in the same way that the cylinders and pistons for the table 35 of application Serial Number 571,637 are mounted. These cylinders and pistons function similarly to pistons 20, 21 for causing reciprocation of table T along the ways 55, 56. A manually-operable rotary valve 60, similar to valve 52, is provided for selectively delivering the oil under pressure to the various cylinders containing the floating pistons for the table T. It includes a port for each cylinder 13 on frame 25. Although only eight are disclosed and lettered A to H, any number may be employed. Each of the valves 52 and 60 is provided with a zero position at which no port is provided.

From the foregoing it is evident that the forces that position the saddle S along ways 26 combine with the forces that position table T along ways 55, 56 to produce a couple of force that tends to lift table T and saddle S away from their ways. The previously described bearing structure that totally surrounds the cylindrical ways resists this lifting tendency and insures a high degree of accuracy not otherwise obtainable.

In order to rigidly hold the table T in any pre-determined position while work is being performed, the oil acting on the selected floating piston 20 and main piston 21 should be relatively great. However, high pressure systems normally require a low-capacity delivery mechanism so that a relatively long time interval would be required in moving the floating pistons 20 to engagement with plate 11 or the end of the extensions 31. In the present invention, a combined low pressure large capacity, high pressure low capacity system is employed to produce both of the above-referred-to desired results. Referring to Fig. 5, the table T and saddle S are separated in a diagrammatic arrangement for convenience. It might here be noted that the apparatus is not restricted to a saddle supporting a table. As shown in Fig. 5, the principles of the invention might be applied with equal facility to two separate independently movable members. A motor 61 is adapted to drive a pump 62 having a low-pressure large-volume portion 63 and a high-pressure low-volume portion 64. A conduit 65, leading from reservoir R delivers oil to portions 63 and 64 through branches 66 and 67. With the apparatus in the condition as shown in Fig. 5, valves 52 and 60 are set so that the intermediate cylinders with their floating pistons and corresponding extensions 31 are effective to locate the saddle S and table T. Furthermore, the saddle S and table T are shown in the final position determined by these pistons and extensions 31, and, therefore, only the high pressure portion of the system is operating to hold the saddle S and table T in the predetermined position. High pressure oil from portion 64 passes through a line 68, thence through a valve 69, a duct 70 to a valve mechanism 71 through which the low pressure oil from portion 63 passes. When the high pressure oil is effective as it is in Fig. 5, it acts to operate valve mechanism 71 to shunt the oil from the low pressure portion 63 through a line 72 to the exhaust line 73 leading back to the reservoir.

The high pressure oil passes through line 68 to branches 48 and 74. It acts through branch 48 to open a preloaded valve 76 passing then through the line 49 to the end of the cylinder containing piston 21 acting on its right hand face. The opposite side of piston 21 is exhausted through port 50 as previously explained. The high pressure oil passes through duct 51 of line 48 leading to valve 52, thence through duct 77 to the intermediate cylinder 13 maintaining floating piston 20 against plate 11. Since, as previously explained, the effective area of piston 20 is twice the effective area of piston 21, the saddle S is held in pre-determined position by the differential of force.

Additionally, high-pressure oil passes from line 68 through line 74 acting on a check valve 78 which prevents its passage into valve 71. It flows through duct 79 to valve 60, thence through conduit 80 to the intermediate cylinder for table T forcing its piston 20 against plate 11. High pressure oil also passes through valve 81, thence through line 82 to the end of cylinder 13 adjacent screws 28 forcing piston 21 downwardly (Fig. 5) so that the extension 31 for the intermediate cylinder abuts against its corresponding piston 20 holding table T in pre-determined position in the same way that saddle S is held.

Manually turning valve 52 so that the upper cylinder 13 (Fig. 5) is supplied with oil, exhausts the intermediate cylinder as well as all others for saddle S that contain floating pistons 20. Under these circumstances, the large capacity low pressure oil from portion 63 passes through duct 83, through valve mechanism 71, check valve 78, line 74, line 51, valve 52 and duct 84 into the top cylinder 13 moving piston 20 rightwardly very rapidly due to the large volume capacity of portion 63. So long as piston 20 moves rightwardly and before it contacts extension 31, or plate 11, the high pressure oil from portion 64 is ineffective because of the rapid change of volume of cylinder 13 due to the rapid moving of piston 20 rightwardly (Fig. 5). Accordingly, no high pressure oil builds up in line 68 and hence none appears in duct 70 to shunt the low pressure oil from 63 through the exhaust line 72. Upon contact of piston 20 with extension 31, piston 20 ceases to move thereby permitting the high pressure portion of the system to become effective to move the saddle S to, and rigidly hold it at a pre-determined location as previously described.

Pre-setting the apparatus for a cycle of operations is effected by a system of end gages and indicators for both table T and saddle S. Referring to Figs. 1 and 10, a trough-shaped holder 85 is fixed to the saddle S and is adapted to support end gages 86 within the V-shaped trough thereof. A datum end gage 86' is adapted adjustably to be clamped to the holder 85 by a C-clamp 87. End gages 86 are adapted to be placed within the trough of holder 85 between the datum gage 86' and the operating lever 88 of an indicator 89 fixed to, and movable with the table T. The lever 88 is pivoted at its center and is actuated by a pivotally-mounted spring-pressed detent 88' which in the position shown (Fig. 10) holds lever 88 vertically so that its ends respectively cooperate with the indicator and an end gage. This position of lever 88 is only used during set up of the apparatus. Pivoting detent 88' upwardly causes lever 88 to turn in a counter-clockwise direction so that it clears datum gage 86' during movement of table T subsequent to the initial set up. A similar system is provided between the frame 10 and the saddle S for accurately presetting the saddle.

Figures 6, 7:
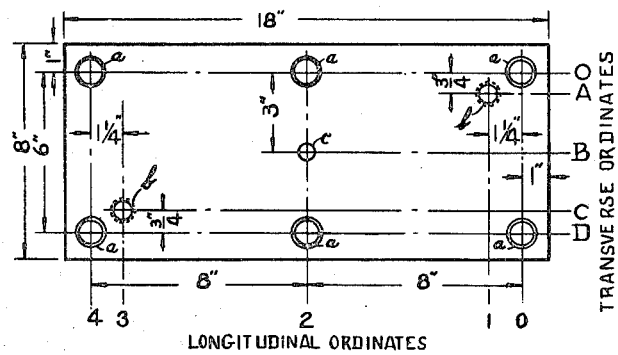
Fig. 6 is a typical work piece adapted to be located by the apparatus for various operations.

One method of setting the apparatus for producing a cycle of operations on work will be described. Referring to Fig. 6, a drawing of a typical cover plate is shown. All the information necessary to complete the pre-setting of the apparatus can be obtained from Fig. 6 and entered, for convenience, on the charts of Figs. 7 and 8.

Operations pertaining to each hole required should be listed in the chart of Fig. 7 and individually identified with appropriate letters or numbers. Like holes should be grouped under one identification mark. The vertical centerlines (Fig. 6) passing through the holes should be numbered consecutively from right to left as longitudinal ordinates. Likewise, the horizontal centerlines (Fig. 6) passing through the holes should be lettered consecutively from top to bottom as transverse ordinates. These ordinates represent dial settings for the valves 52 and 60. The co-ordinates of the holes of Fig. 6 are transposed to the chart of Fig. 8 in positions corresponding to their longitudinal and transverse ordinates of Fig. 6. The dimensions between both longitudinal and transverse ordinates of Fig. 6 are entered on the chart of Fig. 8. These distances are always measured from "0" so that accumulative errors will not occur.

Figure 9:
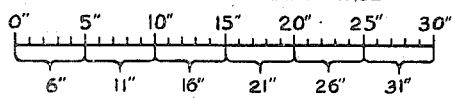

Fig. 9 discloses a scale indicating the length of extension 31 needed for a given adjustment of a screw 28. From this scale, extension lengths are selected and entered on the chart of Fig. 8 beside the corresponding dimension to be produced.

With the chart of Fig. 9 filled out for a given job, it becomes a relatively simple matter to preset the apparatus using the previously mentioned end gages and indicators. For example, with the correct extensions 31 applied to the screws 28 for positions 1, 2, 3 and 4 of valve 52; and for positions A, B, C and D of valve 60, the valves 52 and 60 are turned to their zero positions which admit liquid to the active side of pistons 21 only. This moves table T to the zero location relatively to the drill spindle that holds the tool.

For the work of Fig. 6, locating bars are fixed to table T at right angles to each other and one inch from the center of the tool spindle. These bars provide a means whereby, when successive work pieces are fastened to table T in engagement with the bars, and valves 52 and 60 are set at their zero positions, the tool spindle is in position relative to the work to produce hole $a$ in the upper right hand corner of Fig. 6.

With the lever 88 in the position shown in Fig. 10, the C-clamp 87 is locked with datum gage 86' at a point along trough 85 so that an inside micrometer that is available can be accommodated between the right hand end of datum gage 86' and the lever 88. To properly adjust the apparatus for locating the work on table T to produce hole $b$ in the upper right hand corner of Fig. 6, the valve 50 is set at position 1, and valve 60 at position A. This causes table T to move approximately to the correct position. To locate the table exactly, end gages and/or the inside micrometer are combined in troughs 85 for the table T and saddle S to establish the exact distance from hole $a$ to hole $b$. The table T and saddle S are then moved by adjusting their screws 28 for positions 1 and A until the indicators 89 therefor read zero, at which time these screws are locked. Every other location of the work to produce the desired operations is initially obtained by the same method. After the apparatus is completely set up for a given job, any number of work pieces can be processed with extreme accuracy with the expenditure of a very small amount of time, by simply fastening the work piece to table T against the locating bars and turning valves 52 and 60 to the correct positions successively to locate the work for each operation to be performed.

Although the various features of the new and improved positioning device have been shown and described in detail to fully disclose one embodiment of the invention, it will be evident that numerous changes may be made in such details and certain features may be used without others, without departing from the principles of the invention.

What is claimed is:

1. Apparatus comprising in combination, a member adapted to be moved along a rectilinear path of motion; a master cylinder; a piston within said master cylinder connected to said member; fluid-pressure means for continuously urging said piston in one direction within said master cylinder; a plurality of cylinders parallel to said master cylinder and each containing a floating piston; means for selectively applying fluid pressure to any one of said floating pistons for moving it in a direction oppositely to the movement of the piston in the master cylinder while connecting all other cylinders containing floating pistons to exhaust; an adjustable screw aligned with each of said floating pistons, each screw having a total adjustment of only a fraction of the travel of said floating pistons; means for limiting the amount of motion of said floating pistons and for providing free access to the ends thereof adjacent said screws; and means for attaching extensions to said screws whereby cooperation may be obtained between said screws, extensions and floating pistons throughout the entire path of travel thereof.

2. Apparatus comprising in combination, a member adapted to be moved along a rectilinear path of motion; another member mounted on said first-mentioned member for movement along a path at substantially right angles to the path of motion of said first mentioned member; a master cylinder for each of said members; a piston within said master cylinders and connected to its corresponding member; fluid-pressure means for continuously urging the pistons in said master cylinders in one direction; a plurality of auxiliary cylinders for each of said members, each having a floating piston, therein, and arranged in parallel relation relatively to the member's corresponding master cylinder; means for selectively applying fluid pressure to any one of said auxiliary cylinders for moving the floating piston therein in a direction opposite to the movement of its master piston while connecting all other cylinders containing floating pistons to exhaust; means for limiting the motion of said floating pistons and for providing free access to the ends thereof; a plurality of adjustable screws carried by each member, each aligned with one of said floating pistons for said member, and having an adjustment of only a fraction of the travel of its corresponding floating piston; and means for attaching extensions to said screws of lengths in multiples of the length of said screws, whereby cooperation may be obtained between said screws, extensions and their corresponding floating pistons throughout the entire path of travel of said floating pistons.

3. In an apparatus for moving a member to, and accurately holding it at a point along its path of travel which comprises, a master piston connected to said member for moving it in one direction throughout its path of travel; a floating piston adapted to travel throughout the length of travel of said member for moving it in the opposite direction; a screw connected to said member, aligned with and adjustable throughout only a fraction of the length of travel of said floating piston; means for limiting the travel of said floating piston, and for providing free access to its end adjacent said screw; and means for attaching extensions to said screw of lengths in multiples of the length of said screw, whereby adjustment of said member to any point in its path of travel can be obtained.

4. In an apparatus for moving a member along intersecting paths to, and accurately holding it at any point within the area defined by said paths which comprises, a master piston for each path adapted when rendered effective to continuously urge said member in one direction along said paths; a floating piston for each of said paths adapted to be moved throughout the extent of travel of said member along said paths; an adjustable screw for each path, aligned with, and adjustable throughout only a fraction of the length of travel of its floating piston; means for limiting the travel of said floating pistons and for providing free access to their ends adjacent their screws; and means for attaching extensions to said screws of lengths in multiples of the length of said screws, whereby adjustment of said member to any point along both its paths of motion can be obtained.

5. In an apparatus for moving a member to, and accurately holding it at a plurality of points along its path of travel within a cycle of operations which comprises, a master piston connected to said member for moving it in one direction throughout its path of travel; a plurality of floating pistons adapted to travel throughout the length of travel of said member for moving it in the opposite direction; screws connected to said member, one for each of said floating pistons and aligned therewith, said screws being adjustable throughout only a fraction of the length of travel of said floating pistons; means for limiting the extent of movement of said floating pistons and for providing free access to their ends adjacent said screws; means for attaching extensions to said screws of lengths in multiples of the length of said screws, whereby adjustment of said member to any point in its path of travel can be obtained for each operation within said cycle; and means for selectively applying fluid pressure to any one of said floating pistons and for connecting all others to exhaust.

6. In an apparatus for moving a member along intersecting paths to, and accurately holding it at any point within the area defined by said paths which comprises, a master piston for each path adapted when rendered effective to continuously urge said member in one direction along said paths; a plurality of floating pistons for each of said paths adapted to be moved throughout the extent of travel of said member along said paths; a plurality of adjustable screws for each path, one for each of said floating pistons and aligned with its respective piston; said screws being adjustable throughout only a fraction of the length of travel of their floating pistons; means for limiting the travel of said floating pistons and for providing free access to their ends adjacent their corresponding screws; means for attaching extensions to said screws of lengths in multiples of the length of said screws, whereby adjustment of said member to any point along both of its paths of motion can be obtained; and separate means for each path for selectively applying fluid pressure to any one of the floating pistons for said path and for connecting all others for said path to exhaust.

7. In a machine tool, a work-support; a tool support; a master piston associated with one of said supports and adapted to be reciprocated within a cylinder; a source of fluid; means adapted when rendered effective continuously to supply said fluid at a substantially constant pressure to the one face of said master piston to urge said one support in one direction along a path; a plurality of floating pistons each having an effective area greater than that of the master piston for urging said one support in the opposite direction along said path; a cylinder for each of said floating pistons; a plurality of threaded openings associated with said support, one for each of said floating pistons and each aligned with its corresponding floating piston; an annular member at the end of the cylinder of each of said floating pistons adjacent said threaded openings for limiting their movement and for providing free access to said floating pistons; a screw for each opening having a length only a fraction of the extent of travel of said floating pistons; means for attaching extensions to said screws of lengths in multiples of the length of said screws, whereby cooperation may be obtained between said screws, extensions and floating pistons throughout the entire paths of travel of said floating pistons; and a distributing valve for selectively admitting said fluid to the ends of any one of the cylinders containing said floating pistons opposite those adjacent said screws and for exhausting all other of the cylinders containing said floating pistons.

8. A positioning device comprising in combination, a member; fluid-operated means for urging said member in one direction along a path; at least one adjustable screw attached to said member; means for attaching an extension of predetermined length to said screw; a fluid-operated floating piston cooperable with said screw and extension for moving said member in the opposite direction along said path; the force exerted by said floating piston exceeding that of the former; means for limiting the travel of said floating piston; and oppositely reacting bearing surfaces for said member whereby any tendency to lift said member from said bearings due to the oppositely acting pistons is eliminated.

9. In a positioning device comprising in combination, a member adapted to be moved along a path; a master cylinder; a piston within said master cylinder and connected to said member; a plurality of auxiliary cylinders parallel with said master cylinder; a floating piston in each of said auxiliary cylinders; an adjustable screw aligned with each of said floating pistons; means for limiting the amount of motion of said floating pistons and for providing free access to the ends thereof adjacent said screws; a fluid-pressure system for all of said cylinders and pistons including a high-pressure low-volume source and a low-pressure large-volume source in parallel relation with said cylinders; a pressure-operated valve for admitting only high pressure to the master cylinder; and a distributing valve for selectively connecting said fluid-pressure system to selected of said auxiliary cylinders.

10. In a hydraulic system, a member; a cylinder; a piston within said cylinder for moving said member; an annular abutment at one end of said cylinder for limiting the movement of said piston and for providing free access to its one end; a rod attached to said member and adapted to extend within said cylinder for abutment with said piston; a source of fluid including a high-pressure low-volume portion, a low-pressure large-volume portion; ducts for conveying said fluid to said cylinder; and means for shunting the large volume of fluid from the low-pressure portion to exhaust when the high-pressure low-volume portion becomes effective.

11. In a hydraulic system, a plurality of floating pistons; a cylinder for each floating piston; a master piston connected to a movable member; separate adjustable means connected to said member adapted to cooperate with each of said floating pistons; a pump having a low-volume high-pressure portion and a large-volume low-pressure portion; common ducts for conveying both said high and low pressure fluids to the cylinders containing said pistons; a pre-settable valve for admitting only high pressure fluid to said master piston; and a distributor valve for selectively admitting said fluid to any of the cylinders containing said floating pistons while exhausting all others thereof.

12. Apparatus for moving a member to, and for rigidly holding it at a plurality of different locations along a path of movement within a cycle of operations comprising in combination, a master cylinder containing a piston that is connected to said member; a plurality of adjustable rods associated with said member; a plurality of cylinders each containing a floating piston and each aligned with one of said adjustable rods; means for limiting the travel of said floating pistons and for providing free access to their ends adjacent said rods whereby said rods can cooperate with their corresponding floating pistons; a pump including a low-pressure large-volume portion and a high-pressure low-volume portion; common ducts for conveying the fluid from said pump to all of said cylinders; an adjustable valve between said pump and said master cylinder for admitting only high pressure fluid to the master piston; and a distributing valve between said pump and the cylinders containing said floating pistons for admitting said fluid to selective of said cylinders containing said floating pistons while exhausting all others.

13. Apparatus for moving a plurality of members to, and for rigidly holding them at a plurality of different locations along separate paths of movement within separate cycles of operations comprising in combination, a master cylinder for each member containing a piston that is connected to its corresponding member; a plurality of adjustable rods associated with each of said members; a plurality of cylinders associated with each member, each containing a floating piston and each aligned with one of said adjustable rods; means for limiting the travel of said floating pistons and for providing free access to their ends adjacent said rods whereby said rods can cooperate with their corresponding floating pistons; a pump including a low-pressure large-volume portion and a high-pressure small-volume portion; common ducts for conveying the fluid from said pump to all of said cylinders; an adjustable valve between said pump and the master cylinder for each member adapted to admit only high pressure fluid to its corresponding master piston; and separate distributing valves between said pump and the cylinders containing the floating pistons for each of said members for admitting said fluid to selective of the floating piston cylinders for each of said members while exhausting all others.

EDWARD P. BULLARD, III.

REFERENCES CITED

The following references are of record in the file of this patent:

UNITED STATES PATENTS

| Number | Name | Date |
|---|---|---|
| 1,957,905 | Owen | May 8, 1934 |
| 2,005,822 | Burrell | June 25, 1935 |
| 2,078,749 | Wood | Apr. 27, 1937 |
| 2,157,762 | Knox | May 9, 1939 |
| 2,185,058 | Graham | Dec. 26, 1939 |
| 2,234,009 | Robinson | Mar. 4, 1941 |
| 2,293,134 | Hallenbeck | Aug. 18, 1942 |
| 2,331,337 | Meyer | Oct. 12, 1943 |
| 2,352,184 | Bullard | June 27, 1944 |
| 2,370,286 | Berger | Feb. 27, 1945 |

FOREIGN PATENTS

| Number | Country | Date |
|---|---|---|
| 538,168 | Great Britain | 1941 |